US012636623B2

(12) United States Patent
Kurovets et al.

(10) Patent No.: US 12,636,623 B2
(45) Date of Patent: May 26, 2026

(54) CARBONATION MACHINE WITH FIXED CARBONATION PULSE DURATION

(71) Applicant: Sodastream Industries Ltd., Kfar Saba (IL)

(72) Inventors: Igor Kurovets, Shoham (IL); Oren Shalev, Ashdod (IL); Guy Megidish, Kiryat Gat (IL); Gal Shner, Kohav Michael (IL); Dvir Brand, Hod-Hasharon (IL)

(73) Assignee: Sodastream Industries Ltd., Kfar Saba (IL)

( * ) Notice: Subject to any disclaimer, the term of this patent is extended or adjusted under 35 U.S.C. 154(b) by 185 days.

(21) Appl. No.: 18/536,210

(22) Filed: Dec. 11, 2023

(65) Prior Publication Data

US 2025/0186952 A1 Jun. 12, 2025

(51) Int. Cl.

*B01F 23/2361* (2022.01)
*B01F 23/236* (2022.01)
*B01F 23/237* (2022.01)
*B01F 101/14* (2022.01)

(52) U.S. Cl.

CPC ...... *B01F 23/2361* (2022.01); *B01F 23/2363* (2022.01); *B01F 23/237621* (2022.01); *B01F 2101/14* (2022.01)

(58) Field of Classification Search

CPC .............. B01F 23/2361; B01F 23/2363; B01F 23/2376

See application file for complete search history.

(56) References Cited

U.S. PATENT DOCUMENTS

| | | | | |
|---|---|---|---|---|
| 3,933,337 | A * | 1/1976 | Morris | F16K 21/06 188/317 |
| 2015/0367296 | A1* | 12/2015 | Cohen | B01F 23/2361 261/65 |
| 2018/0036691 | A1* | 2/2018 | Tatarek | F16K 21/06 |
| 2022/0218142 | A1 | 7/2022 | Guan | |
| 2023/0146835 | A1 | 5/2023 | Baudtler et al. | |

FOREIGN PATENT DOCUMENTS

| | | |
|---|---|---|
| WO | WO 2015144639 | 10/2015 |

* cited by examiner

*Primary Examiner* — Steven W Crabb
*Assistant Examiner* — Spencer H. Kirkwood
(74) *Attorney, Agent, or Firm* — Sterne, Kessler, Goldstein & Fox P.L.L.C.

(57) ABSTRACT

A carbonation machine includes a carbonation head comprising: a carbonation lever configured to be operated by a user to assume a carbonation position to carbonate a liquid in a bottle connected to the carbonation head; a plunger for operating a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and a retractor configured to interact with the carbonation lever such that when the carbonation lever assumes the carbonation position the retractor retracts during a predetermined period of time from an initial deployed state to a retracted position, so as to cause the plunger to move to the closed position and cause the valve to close.

20 Claims, 5 Drawing Sheets

CARBONATION MACHINE WITH FIXED CARBONATION PULSE DURATION

FIELD OF THE INVENTION

The present invention relates to carbonation machines. More particularly, the present invention relates to a carbonation machine facilitating fixed carbonation pulse duration.

BACKGROUND OF THE INVENTION

Carbonation machines are commonly used in homes, offices, cafeterias, and other settings.

Typically, a carbonation machine is designed to carbonate water or other liquid contained in a bottle that is sealingly attached to the carbonation head of the carbonation machine to prevent inadvertent pressure release from the bottle. In the carbonation process carbon dioxide is injected as a jet (e.g., having a typical pressure of some 60 bars) into the water to obtain a sparkling beverage. The injected carbon dioxide creates turbulence in the bottle allowing good distribution and absorption of carbon dioxide in the water, while excess gas is released. Pressure built-up above the water surface inside the bottle may typically be released via designated one or more pressure release valves. When the carbonation process is over the bottle with the carbonated beverage may be removed from the carbonation head of the carbonation machine.

Different users may desire different carbonation levels. In fully manually operated carbonation machines the user may control the level of carbonation by pressing and holding a carbonation button or by rotating and holding a carbonation lever, typically applying several consecutive carbonation actions, e.g., short one second presses, to obtain carbonation at a desired carbonation level. A single long press may cause excessive frothing which in turn may cause water to spray out of the machine valves. Typically, the more presses the higher the obtained carbonation level.

There are known electrically operated carbonation machines for obtaining desired carbonation levels, e.g., featuring a selector for selecting different carbonation levels. Once a certain carbonation level is selected, the appropriate carbonation level is electronically obtained.

It is an objective of the present invention to provide a carbonation machine with a mechanical actuator for facilitating fixed and fully repeatable carbonation pulse duration.

SUMMARY OF THE INVENTION

There is provided, according to some embodiments of the present invention, a carbonation machine that includes a carbonation head. The Carbonation head includes a carbonation lever configured to be operated by a user to assume a carbonation position to carbonate a liquid in a bottle connected to the carbonation head. The carbonation head also includes a plunger for operating a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and a bar having a length that is configured to vary over time configured to interact with the carbonation lever such that when the carbonation lever assumes the carbonation position the length of the bar changes over a fixed duration so as to cause the plunger to move to the closed position and cause the valve to close.

According to some embodiments of the present invention, the carbonation machine also includes an actuator lever, wherein the bar is located between the carbonation lever and the actuation lever.

According to some embodiments of the present invention, the carbonation lever and the actuation lever are configured to be rotated about a shared rotation axis.

According to some embodiments of the present invention, relative motion between the carbonation lever and the actuation lever is facilitated.

According to some embodiments of the present invention, the bar is connected between a free end of the actuation lever and a free end of the carbonation lever.

According to some embodiments of the present invention, the bar comprises a damper.

According to some embodiments of the present invention, the damper is a hydraulic or pneumatic damper.

According to some embodiments of the present invention, the carbonation machine further includes a selector for selecting a carbonation pulse duration from two or more different fixed carbonation pulse durations.

According to some embodiments of the present invention, the selector includes a rotatable selector.

According to some embodiments of the present invention, the selector is coupled to the carbonation lever.

According to some embodiments of the present invention, the selector is configured such that selecting of the desired carbonation pulse duration determines a maximal angle of rotation of the carbonation lever when the carbonating lever is fully pressed, and wherein for each of said two or more different fixed carbonation levels the maximum angle of rotation is different.

According to some embodiments of the present invention, the rotatable selector comprises stopper surfaces of different elevations configured to cause a stopper to stop the rotation of the carbonation lever at different angles of rotation when the carbonating lever is fully pressed, each of the angles of rotations corresponding to a carbonation pulse duration of the two or more different fixed carbonation pulse durations.

According to some embodiments of the present invention, there is provided a carbonation head comprising: a carbonation lever configured to be operated by a user to assume a carbonation position to carbonate a liquid in a bottle connected to the carbonation head; a plunger for operating a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and a bar having a length that is configured to vary over time configured to interact with the carbonation lever such that when the carbonation lever assumes the carbonation position the length of the bar changes over a fixed duration, so as to cause the plunger to move to the closed position and cause the valve to close.

According to some embodiments of the present invention, there is provided a carbonation method that includes operating a carbonation lever to assume a carbonation position to carbonate a liquid in a bottle connected to the carbonation head; using a plunger to operate a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and using a bar having a length that is configured to vary over time configured to interact with the carbonation lever such that when the carbonation lever assumes the carbonation position the length of the bar changes over a fixed duration, so as to cause the plunger to move to the closed position and cause the valve to close.

BRIEF DESCRIPTION OF THE DRAWINGS

In order for the present invention to be better understood and for its practical applications to be appreciated, the following Figures are provided and referenced hereinafter. It should be noted that the Figures are given as examples only and in no way limit the scope of the invention. Like components are denoted by like reference numerals.

DETAILED DESCRIPTION OF THE INVENTION

Figure 1:
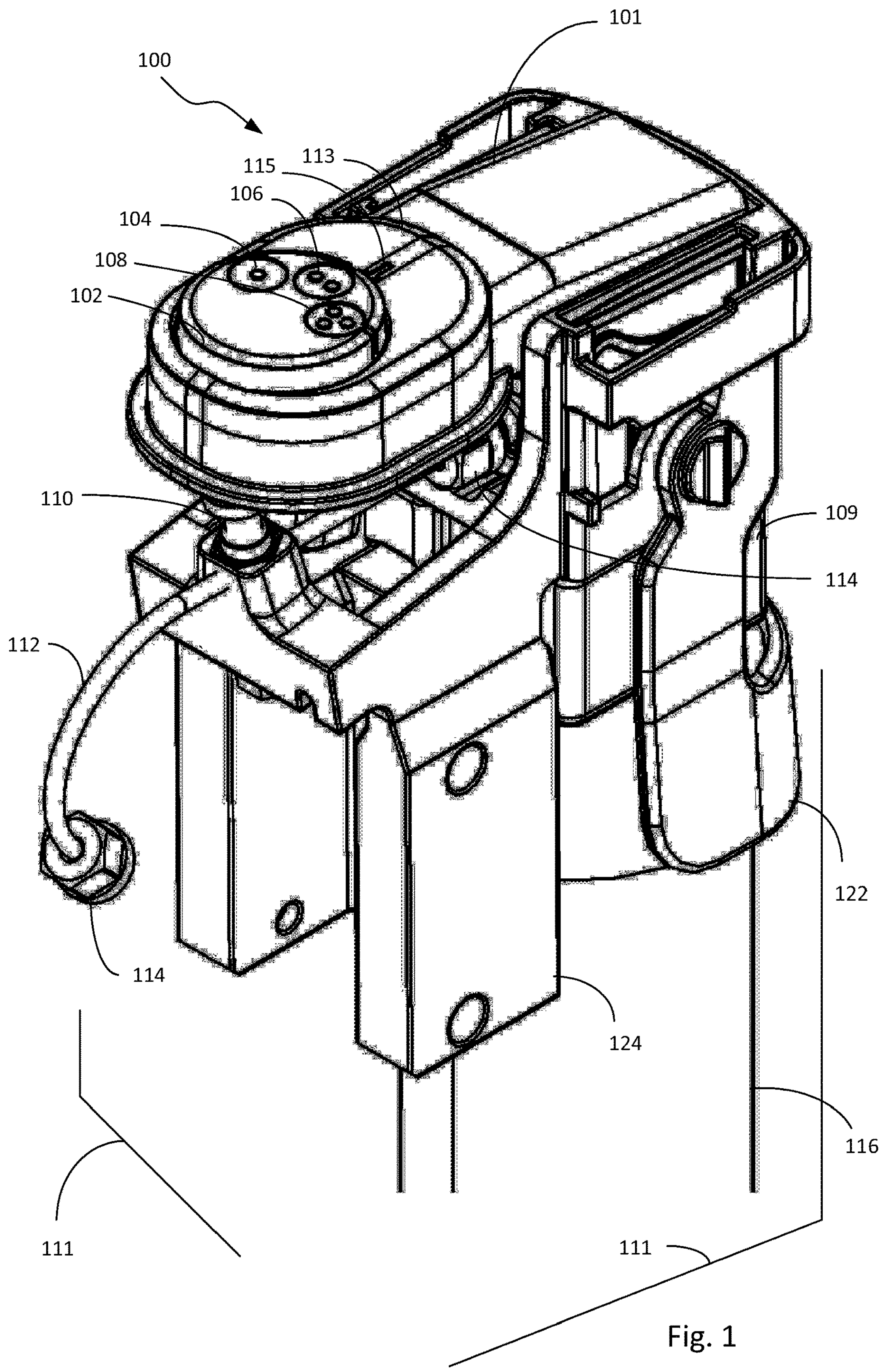
FIG. 1 shows a carbonation head of a carbonation machine for facilitating fixed carbonation pulse durations according to some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

A carbonation machine according to embodiments of the present invention may lack any electrical components and be operated by a fully mechanical design.

Embodiments of the present invention render the design of the carbonation machine a rather simple one, allowing for the manufacturing and offering of a budget friendly and environmental-friendly carbonation machine.

According to some embodiments of the present invention, a carbonation machine is provided which is configured to facilitate carbonation of liquid in a bottle at a fixed and repeatable carbonation pulse duration.

According to some embodiments of the present invention, a carbonation machine may be provided with a carbonation head. The carbonation head may include a carbonation lever configured to be operated by a user to assume a carbonation position in order to carbonate a liquid in a bottle that is connected to the carbonation head.

A plunger may be provided designed to operate a valve of a gas canister that contains carbon-dioxide for carbonating the liquid inside the bottle. The plunger may be configured to be moved between a closed position and an open position, so that when the carbonation lever assumes a carbonation position, the plunger causes the valve of the gas canister to open allowing carbon-dioxide from the gas canister to flow into the bottle to carbonate the liquid.

In order to facilitate a fixed carbonation pulse duration a bar having a length that is configured to vary over time (e.g., a damper) may be provided, configured to interact with the carbonation lever, such that when the carbonation lever is pressed by a user to assume the carbonation position the bar retracts over a fixed duration from an initial deployed state to a retracted position, so as to cause the plunger, that presses open the valve of the gas canister, to move to the closed position and cause the valve to close. In an alternative design (e.g., employing a seesaw-like device) the bar may be configured to extend over a fixed duration from an initial retracted state to a deployed position, so as to cause the plunger, that presses open the valve of the gas canister, to move to the closed position and cause the valve to close.

In some embodiments of the present invention, the carbonation lever and the actuation lever may be configured to be rotated about a shared axis of rotation. The bar may be positioned between the carbonation lever that is designed to be operated by the user and an actuation lever that is designed to translate the user's operation so as to cause the valve of the gas canister of the carbonation machine to open. The bar is provided to allow the actuation lever to rotate back, retract the plunger and allow the valve of the gas canister to close.

According to some embodiments of the present invention, a carbonation machine may be provided designed to allow the user to select a desired carbonation pulse duration from two or more different fixed carbonation pulse durations, to achieve different carbonation levels.

FIG. 1 shows a carbonation head 100 of a carbonation machine, facilitating different fixed carbonation pulse durations, according to some embodiments of the invention.

Carbonation machine 111 (only some outlines of the carbonation machine are shown in FIG. 1, for brevity) may include a carbonation head 100 for facilitating carbonation of water or other beverage that is contained in a bottle mounted to a mount of the carbonation head.

Carbonation head 100 may include gas canister holder 109, for holding gas canister 116. Gas canister 116 may be designed to contain carbon-dioxide in a liquified or fluid state, for use in carbonating water or other beverages.

Carbonation head 100 may include supporting pillars 124 for connecting to a housing (not shown, for brevity) of the carbonation machine.

Carbonation head 100 may include a fitting for connecting to a valve of any kind of a gas canister that the carbonation head is designed to hold, so as to facilitates flow of carbon dioxide from the gas canister into a bottle containing water or other beverage to be carbonated, which may be securely mounted to the carbonation head 100. See, for example, FIG. 2, and related description, for more information and details.

Handle 122 of carbonation machine 100 may be configured to be raised or lowered by rotating it. Handle 122 may be used for operating a mechanism for connecting or disconnecting a valve of the gas canister to or from a connector for receiving and holding the valve. Pipe 112 may be provided, fitted at its opposite ends by connectors 114 for allowing carbon dioxide to flow from the gas canister through the pipe, so as to facilitate flow of carbon dioxide from the gas canister though pipe 112, e.g., via a carbonation tube that may be dipped into the water to be carbonated inside the bottle attached to the carbonation head, to carbonate the water. While FIG. 1 depicts a specific design of a carbonation machine, e.g., having an arrangement for quick connection of the gas canister, various other designs for a carbonation machine may be considered that are also covered by embodiments of the present invention.

Carbonation head 100 may include a carbonation lever 101, rotatable about a rotation axis 127 (e.g., located at an end of the carbonation lever) having a dome 113 at an opposite end of the carbonation lever. In some embodiments the dome 113 may be provided with selection knob 102 on top. Carbonation lever 101 is configured to allow a user to affect carbonation by pressing and rotating down the carbonation lever until it stops and holding the carbonation lever down until a carbonation pulse ends after a preset duration. The user may then repeat pressing the carbonation lever as much as needed (e.g., several times) to obtain a desired carbonation level.

According to some embodiments of the present invention, rotatable selector knob 102 may present to the user two or more selection options of two or more different carbonation pulse durations, for the user to select a desired carbonation pulse duration. For example, rotatable selector knob 102 may have two or more indicators for specific carbonation 1 pulse durations, e.g., indicator 104 for selecting short carbonation pulse duration, indicator 106 for selecting medium carbonation pulse duration, and indicator 108 for selecting long carbonation pulse duration. Selecting a carbonation pulse duration may be carried out by rotating the rotatable selector knob so that the indicator of the desired carbonation pulse duration lines up against marker 115. An alternate embodiment of the present invention may be configured to allow only one fixed carbonation pulse duration (in which case there may be no need for a rotatable selector knob).

Stopper 110, e.g., a fixed rod, a screw or any other protrusion, may be provided on the body of the carbonation head, beneath the carbonation lever 101, e.g., beneath dome 113, to restrict the rotational motion of carbonation lever 101, in a manner which is further explained with reference to FIGS. 2-4.

According to some embodiments of the present invention, the carbonation head is configured to allow a user to select a desired carbonation pulse duration from two or more selectable fixed different carbonation pulse durations, and when the carbonation lever is operated by the user carbon dioxide will be released from the gas canister into the carbonation bottle for a fixed duration of time corresponding to the selected carbonation pulse duration. In order to achieve a desirable carbonation level the user is to repeat pressing several times (e.g., three or four times).

Figure 2:
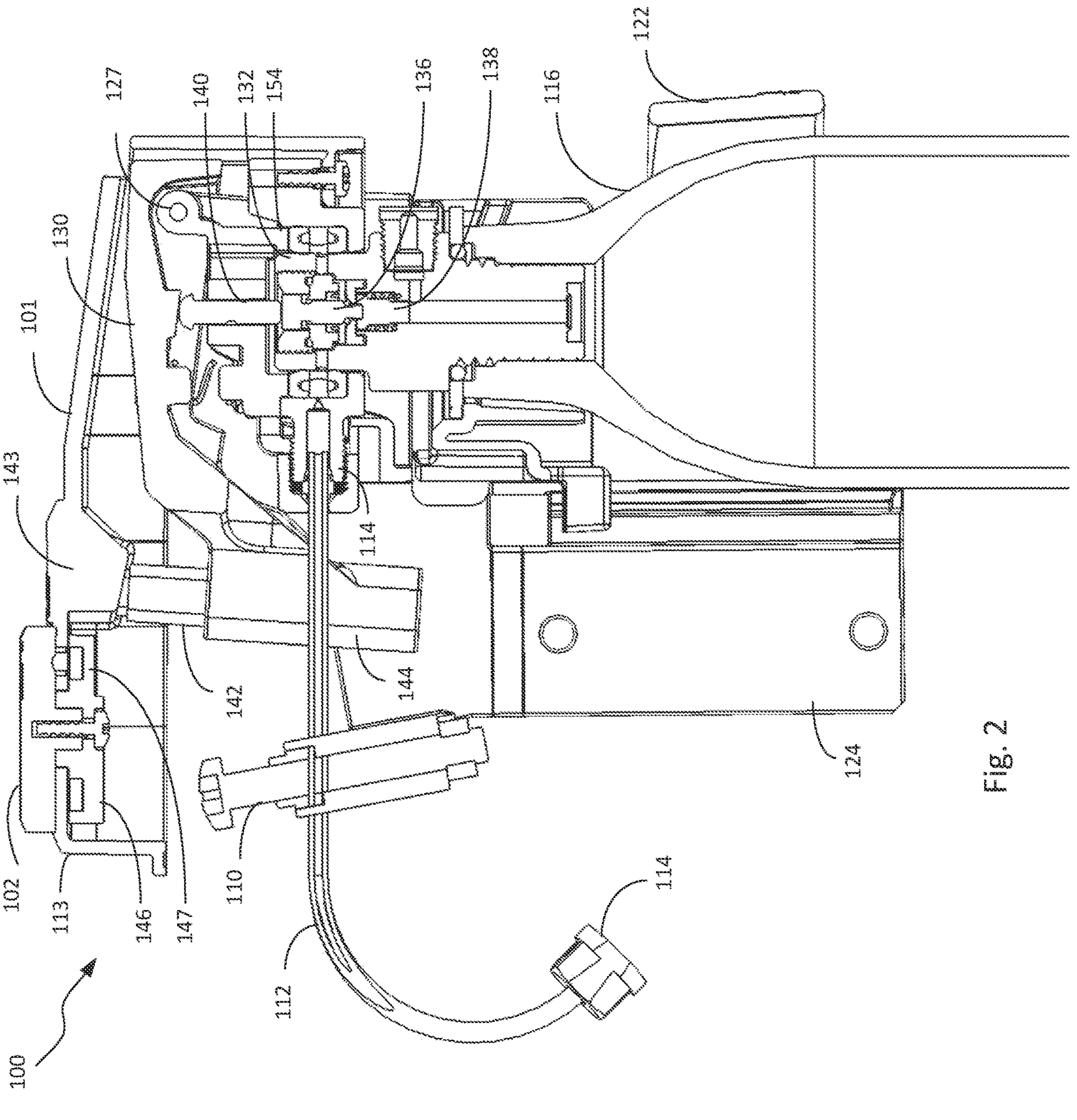
FIG. 2 is a cross-sectional view of the carbonation head of FIG. 1, in a pre-carbonation position.

FIG. 2 is a cross-sectional view of the carbonation head of FIG. 1, in a pre-carbonation position.

Figure 3:
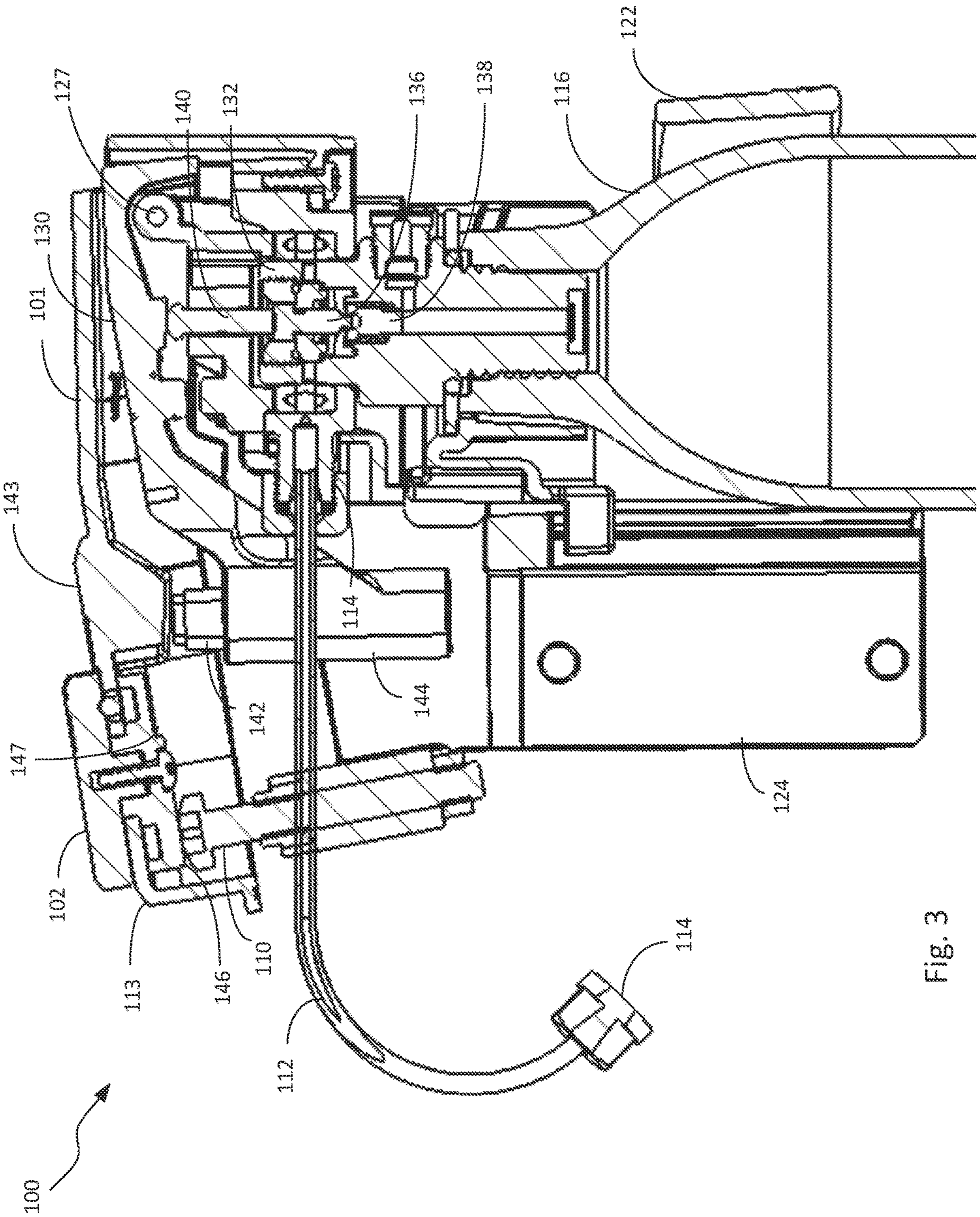
FIG. 3 is a cross-sectional view of the carbonation head of FIG. 1, with a carbonation lever pressed down to affect the carbonation process.

FIG. 3 is a cross-sectional view of the carbonation head of FIG. 1, with an carbonation lever pressed down to start the carbonation process.

Figure 4:
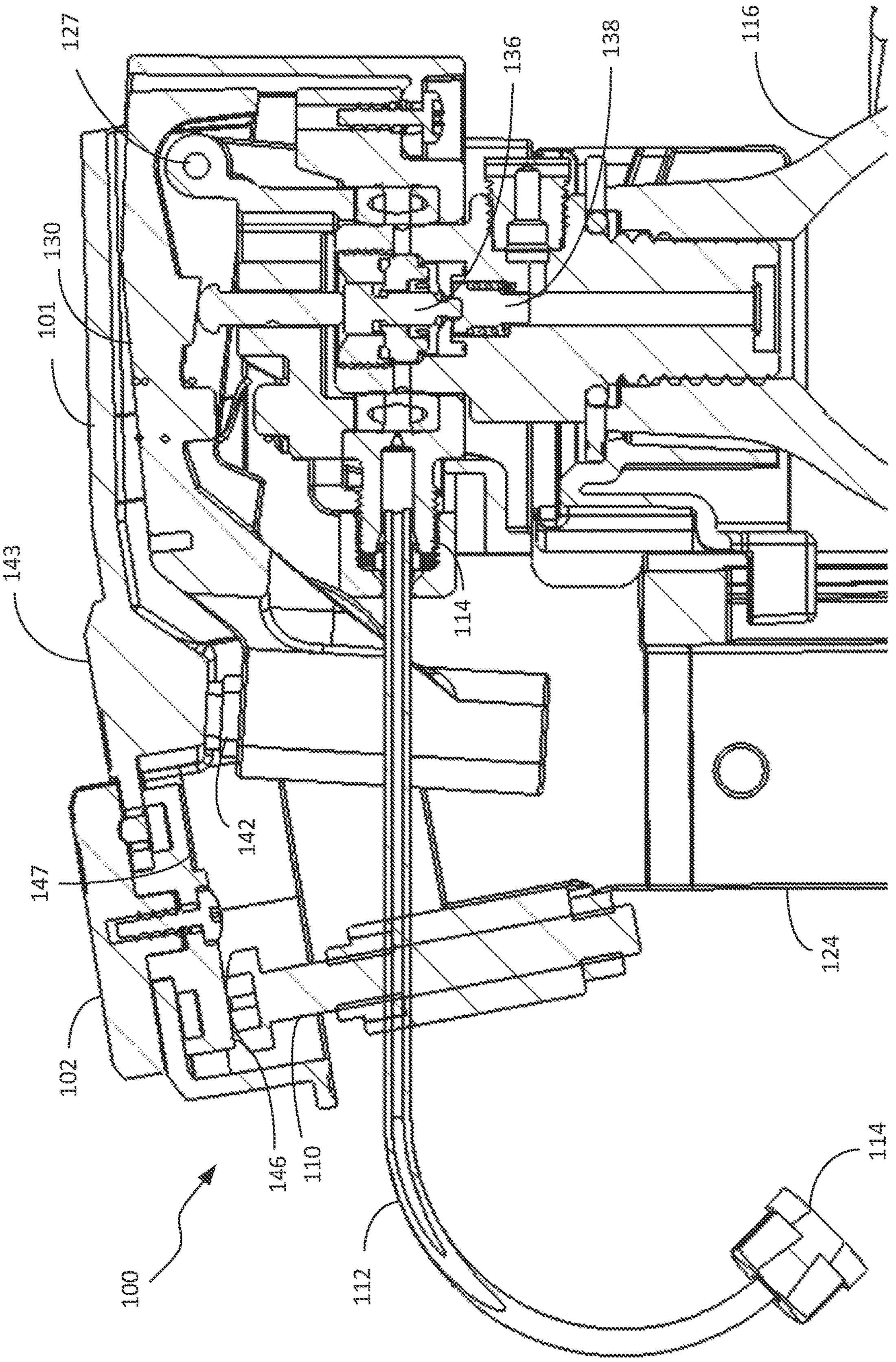
FIG. 4 is a cross-sectional view of the carbonation head of FIG. 1, when the carbonation process has ended.

FIG. 4 is a cross-sectional view of the carbonation head of FIG. 1, when the carbonation process has ended.

Figure 5A:
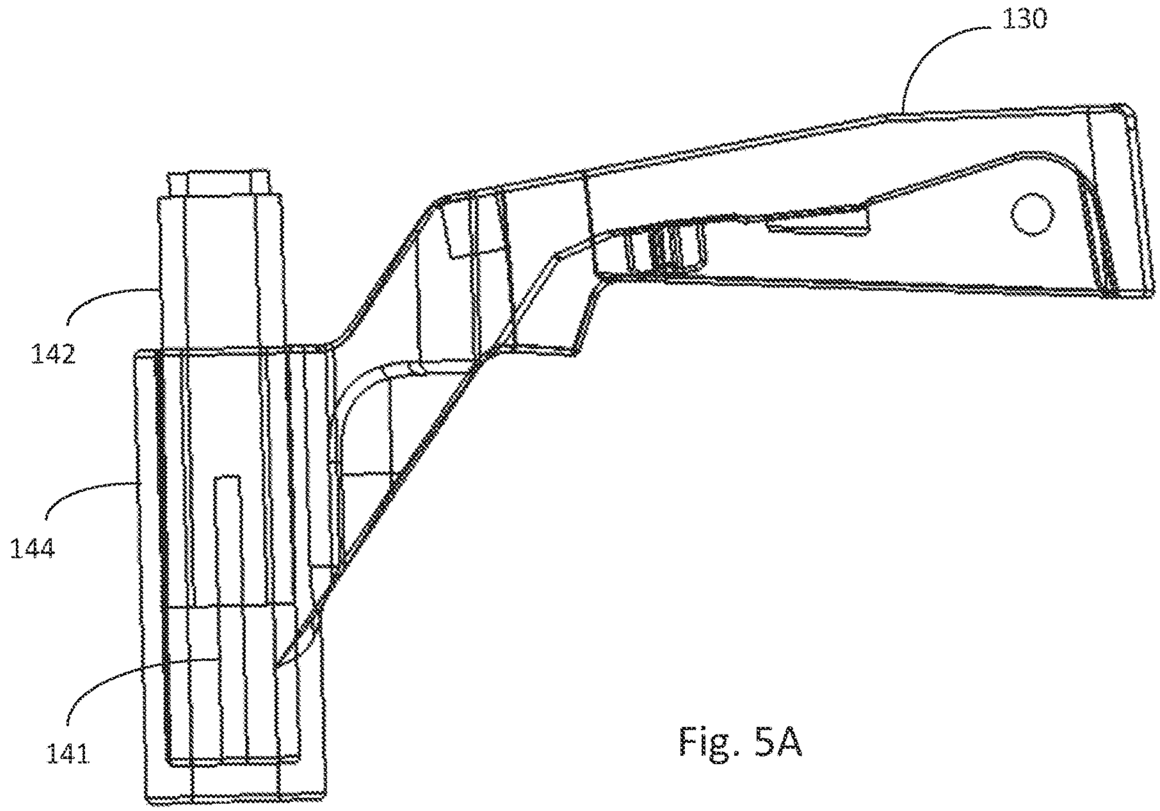
FIG. 5A shows the actuator lever with the piston rod of the damper in a deployed state.

FIG. 5A shows the actuation lever with the piston rod of the damper in a deployed state.

Figure 5B:
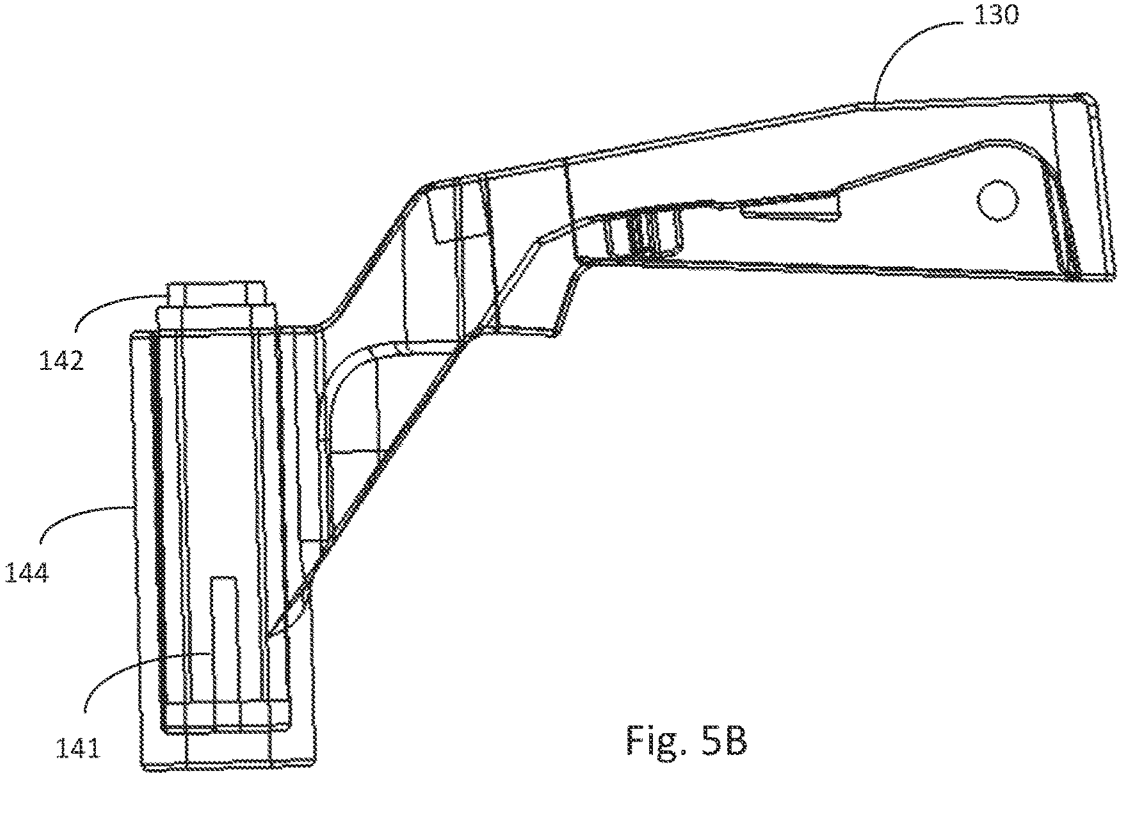
FIG. 5B shows the actuator lever with the piston rod of the damper in a retracted state.

FIG. 5B shows the actuation lever with the piston rod of the damper in a retracted state.

Gas canister 116 may be connected to connector 154 in various alternative ways and held in position (e.g., screwed in position, raised and locked into position etc.) with its valve 132 held fixed in position inside a designated space of connector 154 of carbonation head 100. Valve 132 may include one or a plurality of top or lateral ports for discharging carbon dioxide from gas canister 116, when poppet 138 is pressed from a default closed position to an open position by plunger 140. The released carbon dioxide is directed via connector 114 and via pipe 112 to carbonate the water (or other beverage) inside the bottle held to the carbonation head.

According to some embodiments of the present invention, actuation lever 130 is also provided, which is also linked at one of its ends and configured to be rotated about a shared rotation axis 127. When pressed downwards actuation lever 130 is configured to push plunger 140 downward to move poppet 138 to an open position and facilitate release of carbon dioxide from gas canister 116.

Carbonation lever 101 and actuation lever 130 are coaxially connected to rotation axis 127 but are not firmly linked to each other allowing for some relative motion between the two levers.

At the opposite free end of actuation lever 130 container 144 is provided that is configured to accommodate a damper 142, whereas the other opposite end of damper 142 is configured to be in contact with cap 143 of carbonation lever 101. Damper 142 may be, for example, a hydraulic or pneumatic damper.

When a user rotates carbonation lever 101 downwards, for example by pressing selector 102 and holding down dome 113, carbonation lever 101 rotates until stopper surface 146 of selector 102 comes into contact with stopper 110 preventing carbonation lever 101 from further rotating in that direction. During that rotation plunger 140 is depressed, while at the same time damper 142 is presses as well.

Due to the inherent resistance of the damper, piston rod 141 of damper 142 retracts slowly into the damper, so that effectively the damper initially presents a rigid structure, so that when the carbonation lever 101 is pressed down cap 143 and damper 142 force actuation lever 130 to rotate as well, and press plunger 140 that in turn presses poppet 138. Carbon dioxide is then released, commencing carbonation, but eventually piston rod 141 starts contracting within a determined period of time, which depends on the damping properties of the damper 142, allowing actuating lever 130 to slowly rise eventually allowing plunger 140 to retract to its initial position and raise poppet 138 to the closed position, thereby ending the carbonation process.

The duration of the carbonation process, and hence the carbonation pulse duration obtained, is basically determined by the angle of rotation of carbonation lever 101 and by the restoration time of the damper, while it is not affected by holding the carbonation lever 101 pressed in its rotated position.

As the restoration time of the damper provided in the carbonation head is typically fixed it is the angle of rotation of carbonation lever 101 that may be controlled to affect different carbonation pulse durations.

According to some embodiments of the present invention, rotatable selector knob 102 may be provided with stopper surfaces facing stopper 110 at different elevations. Thus, when a specific carbonation pulse duration is selected by rotating the appropriate indicator (104, 106 or 108) to line up with marker 115, a stopper surface 146 or 147 which have different elevations, dictate the duration of the carbonation pulse that may be achieved. For a longer carbonation pulse to be reached, the stopper surface 147 facing stopper 110 has to be higher than the stopper surface 146 associated with the selection of shorter carbonation pulse duration by aligning the appropriate carbonation pulse duration indicator (104, 106 or 108) with marker 115.

Following is an index of elements shown in the figures:

100—carbonation head;
101—carbonation lever;
102—rotatable selector knob;
104—indicator for low carbonation level;
106—indicator for medium carbonation level;
108—indicator for high carbonation level;
109—gas canister holder;
110—stopper;
111—carbonation machine;
112—pipe;
113—dome;
114—connector;
115—marker;
116—gas canister;
122—handle;
124—pillar;
127—rotation axis;
130—actuation lever
132—valve;
138—poppet;
140—plunger;
141—piston rod;
142—damper;
143—cap;
144—container;
146—stopper surface;
147—stopper surface;
154—connector;

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A carbonation machine comprising:
a carbonation head comprising:
a carbonation lever configured to be operated by a user to assume a carbonation position to carbonate a liquid in a bottle connected to the carbonation head;
a plunger for operating a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and
a bar having a length that is configured to vary over time configured to interact with the carbonation lever such that when the carbonation lever assumes the carbonation position the length of the bar changes over a fixed duration so as to cause the plunger to move to the closed position and cause the valve to close.

2. The carbonation machine of claim 1, further comprising an actuator lever, wherein the bar is located between the carbonation lever and the actuation lever.

3. The carbonation machine of claim 2, wherein the carbonation lever and the actuation lever are configured to be rotated about a shared rotation axis.

4. The carbonation machine of claim 3, wherein relative motion between the carbonation lever and the actuation lever is facilitated.

5. The carbonation machine of claim 4, wherein the bar is connected between a free end of the actuation lever and a free end of the carbonation lever.

6. The carbonation machine of claim 1, wherein the bar comprises a damper.

7. The carbonation machine of claim 6, wherein the damper is a hydraulic or pneumatic damper.

8. The carbonation machine of claim 2, further comprising a selector for selecting a carbonation pulse duration from two or more different fixed carbonation pulse durations.

9. The carbonation machine of claim 8, wherein the selector comprises a rotatable selector.

10. The carbonation machine of claim 9, wherein the selector is coupled to the carbonation lever.

11. The carbonation machine of claim 10, wherein the selector is configured such that selecting of the desired carbonation pulse duration determines a maximal angle of rotation of the carbonation lever when the carbonation lever is fully pressed, and wherein for each of said two or more different fixed carbonation levels the maximal angle of rotation is different.

12. The carbonation machine of claim 11, wherein the rotatable selector comprises stopper surfaces of different elevations configured to cause a stopper to stop the rotation of the carbonation lever at different angles of rotation when the carbonation lever is fully pressed, each of the angles of rotations corresponding to a carbonation pulse duration of the two or more different fixed carbonation pulse durations.

13. A carbonation head comprising:
a carbonation lever configured to be operated by a user to assume a carbonation position to carbonate a liquid in a bottle connected to the carbonation head;
a plunger for operating a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and a bar having a length that is configured to vary over time configured to interact with the carbonation lever such that when the carbonation lever assumes the carbonation position the length of the bar changes over a fixed duration, so as to cause the plunger to move to the closed position and cause the valve to close.

14. The carbonation head of claim 13, further comprising an actuator lever, wherein the bar is located between the carbonation lever and the actuation lever.

15. The carbonation head of claim 14, wherein the carbonation lever and the actuation lever are configured to be rotated about a shared rotation axis.

16. The carbonation head of claim 15, wherein relative motion between the carbonation lever and the actuation lever is facilitated.

17. The carbonation head of claim 16, wherein the bar is connected between a free end of the actuation lever and a free end of the carbonation lever.

18. The carbonation head of claim 13, wherein the bar comprises a damper.

19. The carbonation head of claim 18, wherein the damper is a hydraulic or pneumatic damper.

20. A carbonation method comprising:

operating a carbonation lever to assume a carbonation position to carbonate a liquid in a bottle connected to the carbonation head;

using a plunger to operate a valve of a gas canister between a closed position and an open position, whereby, when the carbonation lever assumes a carbonation position, the plunger causes the valve to open so as to allow carbon-dioxide from the gas canister to flow into the bottle to carbonate the liquid; and using a bar having a length that is configured to vary over time configured to interact with the carbonation lever such that when the carbonation lever assumes the carbonation position the length of the bar changes over a fixed duration, so as to cause the plunger to move to the closed position and cause the valve to close.

* * * * *